3,810,857
BITUMINOUS COMPOSITIONS CONTAINING PLASTIC OR ELASTOMER POLYSULPHIDE POLYMERS
Claude Garrigues, Noisy-le-Grand, Albert Nicolau, Pau, and Jean-Baptiste Signouret, Billere, France, assignors to Societe Nationale des Petroles d'Aquitaine Tour Aquitaine, Courbevoie, France
No Drawing. Filed Nov. 15, 1971, Ser. No. 199,039
Claims priority, application France, Nov. 20, 1970, 7041788; Oct. 20, 1971, 7137690
Int. Cl. C08g 51/52; C08h 13/08; C10c 3/02
U.S. Cl. 260—28    22 Claims

ABSTRACT OF THE DISCLOSURE

A process for preparing bituminous compositions for standard applications of bitumen, characterized by the fact that variable amounts of one or more plastic or elastomer polysulphide polymers, free from non-combined elemental sulphur, and which will mix with a fluxing oil, bitumen, bitumen cuts or fractions of such cuts, are added to the bitumen.

New bituminous compositions obtained by means of the process in question. These compositions have many applications, particularly in road-building, as a waterproofing material, for the coating of paper, for the preparation of seaproof paints, in soundproofing, in hydraulic engineering and metal coverings.

---

This invention concerns a plastic bituminous composition containing bitumen and an organic polysulphide-based plastic or elastomer material. It also concerns a process for preparing this composition.

Bitumens are known to be used in many fields; they are employed in the building of roads and other traffic areas, as a waterproofing material, for coating paper, in preparing seaproof paint, in soundproofing, hydraulic engineering, metal coatings and many other sectors. Pure bitumen is sufficient where working requirements are normal, but when, as in the case of certain engineering structures, the requirements become more severe, the bitumen has to be modified; pure bitumens no longer meet the standards of hardness, elasticity, watertightness and resistance to heat and cold that are involved, particularly on roads carrying heavy traffic, whether they are used for surface covering or in the preparation of coated materials for roads, motorways or any other surfaces bearing vehicular traffic. The normal properties of bitumen have to be improved, and in addition, special qualities have to be provided in some cases. The modifying agent chosen must correspond to these requirements, and to the nature of the bitumen involved.

A number of bitumen-modifying products and compositions already exist. Special efforts have been made to improve plasticity, involving, for instance, the addition of rubbers such as polybutadienes. This is very expensive, since large amounts of rubber are needed. In addition, polybutadiene forms an unstable phase which precipitates to the bottom of the bitumen. This means that very cumbersome mixing and pumping installations are needed, so that the process is uneconomic.

Sulphur is also sometimes added to the bitumen. Although this improves some of the properties of the bitumen, particularly stability and resistance to creeping, the improvement is inadequate to meet the requirements involved in service. Plasticity when cold is not improved; in fact the sulphur brings about a hardening which makes the bitumen brittle. Furthermore, placing of the bitumen and sulphur mixture presents problems.

Bitumen can also be modified by adding varying amounts of plasticized sulphur to it. This is a plastic material consisting of sulphur and a plasticizer which reduces the viscosity of the molten sulphur. A small amount of the plasticizer is added to the sulphur. There is still free, chemically non-combined sulphur in what is known as "plasticized sulphur." The plasticizer is usually a dithiol compound, possibly represented by the general formula $H(SAS)_nH$, covering a very wide range of dithiols, where A may stand for one of the wide variety of groups mentioned in work on the plasticization of sulphur, such as a hydrocarbon group containing at least 2 carbon atoms, the hydrocarbon chain possibly including etheroxide, sulphide or polysulphide groups with an average S degree of 2 to 4, and where $n$ equals between 1 and 10. When $n$ equals 1, the compound will be referred to from now on as a "dithiol," and when it is more than 1, the compound will be referred to as a "dithiol polysulphide."

It has already been shown that aromatic, cyclic or aliphatic liquid dithiols or dithiol polysulphides containing aliphatic etheroxide chains, produced by the firm Thiokol and sold under the names "LP$_3$" or "ZM 399," or products obtained from reaction of a halogeno epoxyalkane and hydrogen sulphide with an aqueous solution of an alkaline metal polysulphide, or products obtained from reaction of sulphur and dithiols, or other dithiols, are plasticizers giving a plasticized sulphur which is particularly suitable for the application concerned.

Although the addition of the plasticized sulphur offers clear advantages compared with adding sulphur on its own (bitumen modified with plasticized sulphur has a flexibility, and a plasticity when cold, not possessed by bitumen modified with sulphur alone), bitumen mixed with plasticized sulphur still has certain defects. Trial applications have shown that there is no advantage in having excess elemental sulphur, and that it may even be a drawback. Bitumen modified by plasticized sulphur can be obtained by adding the plasticized sulphur directly to the hot bitumen. It melts on coming into contact with the bitumen, and the excess sulphur ensures simple, satisfactory dispersal. In cooling, however, the excess forms deposits which clog pipes and present quite troublesome cleaning and maintenance problems. In addition, this sulphur has an extremely corrosive effect on the ferrous metals used in the construction of bitumen heaters.

For all these reasons, it would be useful to have a composition conferring the properties of rubbers, sulphur and plasticized sulphur on bitumen, without the drawbacks already described.

The present invention offers a way of overcoming these drawbacks by using sulphur-based products possessing plastic and elastomeric properties. These can be added to bitumen to produce modified bitumens that are easy to lay, that have the qualities required for the application involved, and that have no elementary sulphur. Bitumens thus obtained retain their strength in heat or cold, offer satisfactory elasticity, are waterproof and are not attacked by oils.

Ageing tests in an oxidizing oven at 58° C., under infrared or ultra-violet radiation, have given excellent results. They show that modified bitumen withstands aging well, and that its cohesiveness is increased; it can be heated to 55° C. without alteration, an extremely important factor, particularly in bitumens being used on roads where high temperatures are possible. The description below will show other advantages of the invention.

The new process for preparing a bituminous composition according to the present invention is characterized by the fact that one or more plastic or elastomer polysulphides, free from elemental sulphur and which will mix with a fluxing oil or with the bitumen itself, are added to the bitumen.

Various categories of bitumens, from various origins, may be used. The term "bitumen" will be used below to cover all the products resulting from petroleum distillation, and by-products such as blown bitumens, natural asphalts, coal-tars and schist oils, all of these being known as "black products." Bitumens also include residues resulting from distillation of wood and resins. The various categories of bitumen are classified according to their "penetration index," in other words the distance in tenths of a millimetre that a standard needle, carrying a 100 g. load, penetrates in 5 seconds at a temperature of 25° C. Blown bitumens are also classified according to their softening point, known as the "Bille and Anneau temperature."

The plastic or elastomer polysulphides in this invention are polysulphide polymers. They must mix with a fluxing oil or with the actual bitumen. They can be obtained by the action of sulphur either on dithiols or on dithiol polysulphides of low molecular weight, as already described, preferably in the presence of an amine as catalyst. These polysulphide polymers do not contain any free sulphur. The sulphur used to change dithols or dithiol polysulphides into polysulphide polymers acts on the thiol functions as an oxidizing agent, with elemination of $H_2S$ and the formation of polysulphides by lengthening of the chain. The average sulphur degree of the polymer is at least 2; in plastic and elastomer polysulphide polymers it is not more than 20, and is preferably between 3 and 8. The sulphur also acts as a polymerizing agent, resulting in polysulphide polymers with a molecular mass, which which varies depending on the original dithiols, between that of the original dithiol and 20,000, and preferably between 500 and 5,000. The degree of polymerization must be kept low enough to ensure that the polysulphide will mix with oils and black products. If the average sulphur and polymerization degrees are above the levels mentioned above, the result is a hard, non-plastic polysulphide polymer which will not mix with fluxing oil or bitumen.

The amount of sulphur to be added to dithiols or liquid dithiol polysulphides to obtain polysulphide polymers that can be used in the present invention is between 1 and 20, and preferably 3 and 10 sulphur equivalents per dithiol molecule.

When polysulphide polymers are prepared in accordance with this process, namely through the action of sulphur on a dithiol, with from 1 to 20 sulphur equivalents per dithiol molecule, a plastic material—in other words a substance which can be stretched, but which does not return to its initial length when tension is removed—is obtained. Bitumen modified with these plasticizers forms a much better bond with most backing materials, such as stones and gravel, than bitumen alone, or bitumen modified by other existing methods. It has special mechanical properties making it particularly suitable for use in cases where compositions with plastic properties are required.

In one embodiment of the invention, a cross-linking product is added to the reaction mixture of dithiols and sulphur, giving the polysulphide polymer elastomeric properties (an elastomer being a substance which can be changed in shape at atmospheric temperature, and which lengthens when pulled, regaining its original length when tension is removed). The cross-linking agent is a polyfunctional, and particularly tri-functional product. It may contain thiol functions and/or ethylene functions. Suitable cross-linkage agents include, in particular, and without being confined to them, the following products: propane trithiol, allyl maleate, and esters resulting from the esterification of aromatic polyacids such as pyromellitic anhydride with mercapto alcohols, and the products resulting from the complex reaction between maleic anhydride and mercapto alcohols.

The amount of cross-linkage agent to be added to the reaction mixture depends on the elastomer properties required. It is generally between 1 and 90% of the weight of sulphur and dithiol.

When added to bitumen, elastomeric polysulphide polymers produce a bituminuous material which is especially suitable for use in surfacing bridges, or other engineering structures subject to strains, corrosion, erosion, vibration or strong sunlight.

The dithiols and dithiol polysulphides that are specially suitable for use in preparing plastic or elastomeric polysulphide polymers include all those already used in sulphur plasticization, namely dithiols or liquid polysulphide dithiols, which may be aromatic, cyclic or aliphatic compounds containing aliphatic etheroxide chains, and particularly the formal group; such compounds include products known commercially as Thiokols, as well as compounds with a longer aliphatic chain. These compounds may be prepared by methods different from those for Thiokol, and the aliphatic chain may be that of diethyl, dipropyl, dibutyl or dialkyl formal. Other suitable substances are dithiols or dithiol polysulphides obtained by the simultaneous action of a halogeno epoxyalkane and hydrogen sulphide on an aqueous solution of an alkaline metal polysulphide, and in general dithiols with the general formula $H(S—A—S)_nH$. Use may also be made of a whole range of other products not previously used in preparing plasticized sulphur, and this widens the range of the invention considerably. When a plasticized sulphur is being prepared, the plasticizer used (dithiol or dithiol polysulphide) must be soluble in sulphur, which acts as a solvent in the mixture. This restricts the range of plasticizing agents considerably, since many dithiols are not soluble in all proportions in elemental sulphur. But with the process according to the present invention, it has proved possible to use a very wide range of plastic or elastomeric polysulphide polymers, in which the original dithiol or dithiol polysulphide is either insoluble or only slightly soluble in sulphur, and the use of which had had to be ruled out for modifying bitumens with plasticized sulphur.

One particular embodiment of the invention involves the use, as dithiols for the preparation of plastic or elastomeric polysulphide polymers, of a new category of compounds which had not previously been used in making plasticized sulphur: diester dithiols of saturated aliphatic, aromatic, alkyl-aromatic or cyclanic diacids, with the general formula

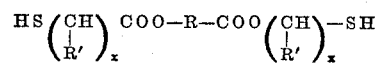

where R is an aliphatic hydrocarbon group, substituted or not, and containing from 2 to 12 carbon atoms, and possibly including chalogen elements such as sulphur or oxygen, R' is hydrogen or a hydrocarbon group containing from 2 to 12 carbon atoms, and $x$ is from 2 to 10. These diester dithiols may be obtained by any known method, such as the action of a saturated aliphatic, aromatic, alkyl-aromatic or cyclanic diacid

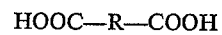

on a mercapto alcohol

branched or not, or the action of a glycol on a mercapto acid. A mercapto acid can also be made to react with a mercapto alcohol.

Particularly useful products have been obtained from diacids such as oxalic, succinic, adipic, thiodipropionic, sebacic or thioglycolic diacid. For example, mercapto ethyl adipate can be obtained from adipic acid and mercapto ethanol, mercapto ethyl thiodipropionate from thiodipropionic acid and mercapto ethanol, mercapto ethyl thioglycolate from thioglycolic acid and mercapto ethanol. These diester dithiols react with sulphur to form a particularly useful bitumen additive.

The amines used as catalysts for the sulphur-dithiol reaction may be primary, secondary or tertiary amines. They must have a boiling point at least equal to the temperature at which the sulphur-dithiol reaction takes place, in other words between 120 and 160° C. The amount used is approximately 1% of the weight of sulphur and dithiols.

Suitable amines include morpholine, diphenyl guanidine, tributyl amine, dibutyl amine and triethyl amine.

To prepare polysulphide polymers, the dithiol monomer or dithiol polysulphide of low molecular weight, heated or unheated, is added gradually, and while the mixture is stirred, to the calculated quantity of molten sulphur, containing the amine as catalyst. If an elastomeric polymer is required, the cross-linking agent is also added to the reaction mixture. While this mixing is taking place, the dithiol reacts with the sulphur, at a temperature of from 120 to 160° C., depending on the dithiol being used. When the dithiol and possibly the cross-linkage agent have been added, the reaction mixture is kept at around 150 to 160° C. for approximately half an hour, until the plastic or elastomeric polymer forms. This can be checked, for instance, by the increase in the stirrer torque. The reaction is halted when the mixture tends to gel, and the viscosity has reached the measurement limit.

These plastic or elastomeric polysulphide polymers can be used in any proportion with bitumen, the amount varying depending on the modification required and the quality of the bitumen employed. If, for example, modified bitumens for use as a road-surfacing material are required, the proportion should be between 0.2 and 10%. Excellent results have been obtained with an 80/100 bitumen to which 0.5 to 2.5% weight of polysulphide polymers have been added.

One embodiment of the invention consists of dissolving or dispersing these polysulphide polymers in a fluxing oil, or in approximately an equivalent quantity of bitumen, before adding them to the mass of bitumen. The use of fluxing oil to prepare bitumen for surfacing purposes exists in the previous art, being practically essential with such materials, since it lowers the hot viscosity of the bitumen, allowing it to be spread easily in thin layers, while retaining its elasticity and resistance to cold.

It is particularly convenient that polysulphide polymers will mix with such oils. This dispersion produces a composition which is liquid when cold, and can be mixed easily with bitumen. The fluxing oil acts as a carrier for the bitumen-modifying agent, and preliminary dispersal of the polysulphide polymer in the fluxing oil is designed to make subsequent dissolution and even distribution of the polymer in the bitumen easier. The polymer dispersed in a fluxing oil can also be added to an already fluxed bitumen. However, although fluxing oil offers these advantages, it also presents some drawbacks: it is expensive, and it causes bleeding, in other words the rise of light products to the surface of the bitumen when laid. Quite surprisingly, when polysulphide polymers are used to modify bitumen, it is found that the total amount of fluxing oil required (fluxing oil for dispersal of the polymer plus fluxing oil possibly mixed with the bitumen) is smaller than the amounts previously used. The phenomenon of bleeding is also considerably reduced. The amount of oil for dispersal of the polysulphide polymer may vary, but 50/50 weights are generally used. If the modified bitumen is intended for use in rolled asphalt or emulsions, cold or hot mix, oil is not longer used as the carrier, but bitumen itself (this carrier bitumen being selected from any class of bitumen is used). For other applications, such as coated papers or paint, the polysulphide polymer is dissolved in a volatile solvent, and this solution is added to the bitumen.

One embodiment of the invention consists of using, to make these dispersions, certain fractions of bitumen which contain products that react particularly with polysulphide polymers, or pure products that could be extracted from these cuts. For instance, use may be made of cuts containing coumarone oils, polyindenic oils, polyolefin resins, aliphatic and aromatic resins. Such compositions are found in commercial products sold under the names of "Escorez resins," which are resinous substances extracted form petroleum, and "Norsolene resins," which are resinous substances extracted from coal oils.

The modifying agent obtained by dispersing polysulphide polymers in bitumen cuts or in the products described above gives the bitumens with which it is mixed, whether by means of a fluxing oil or not, particularly useful properties regarding protection and watertightness. This modifying agent is obtained by heating a mixture of polysulphide polymers and the products listed above to a temperature of from 140 to 160° C. for approximately an hour, so that the various ingredients react with one another.

In one particular embodiment of the process, the modifying agent is is prepared in situ. Polymerization of the dithiols or dithiol polysulphides into polysulphide polymers, using sulphur, is carried out within the bitumen, fluxing oil, bitumen cuts or fractions of such cuts. To prepare the modifying agent in this way, the dithiol monomer, or dithiol polysulphide of low molecular weight, the calculated quantity of molten sulphur, the amine and if necessary the cross-linking agent are added to approximately an equal amount of fluxing oil or bitumen, while the mixture is being stirred. The temperature can range form 120 to 160° C., depending on the dithiol employed. The reaction mixture is kept at around 150 to 160° C for approximately half an hour following the adding of the various ingredients.

When the modifying agent is prepared in this way, the bituminous materials obtained by addition of the agent to bitumen have cohesion and impact properties 30% better than those for bitumen obtained in accordance with the earlier alternative.

The modifying agent obtained by either of the processes or variants described above is then added when hot to a molten bitumen when the bitumen is ready to be placed.

Another feature of the invention is that one or more polysulphide polymers may also be added to bitumen as a modifying agent.

The invention is illustrated by, without being confined to, the following examples and tables.

Examples 1 to 4 refer to the preparation of polysulphide polymers, Examples 5 to 7 to the preparation of the bitumen-modifying agent; Example 8 concerns the preparation of the modified bitumens; Tables 1 to 9 show the results of cohesiveness tests, for bitumen alone, unaged modified bitumen, and modified bitumen that has been aged under infra-red or ultra-violet radiation for 72 hours, in an oxidizing oven, at a temperature of 55° C.

These tables show that cohesiveness, which is very low for unmodified bitumen, increases markedly for modified bitumen. The cohesiveness test using the pendulum cohesionmeter is designed to measure the internal mechanical strength of the bitumen within a temperature range of −33 to +55° C. This test consists of placing a thin layer of bitumen (1 mm.) between the corrugated flat surface of two blocks of steel, and breaking it along a plane parallel to these surfaces by the pendular fall of a given mass. The force needed to break the layer of bitumen is calculated, results being given in kgm./sq. cm.

EXAMPLES 1 to 4.—POLYSULPHIDE POLYMER PREPARATION

Example 1

1,280 g. (40 equivalents) of element sulphur and 3.8 g. of tributyl amine are placed in a 5-litre reactor, which is then heated to slightly above the melting point of sulphur (120° C.), 2,560 g. (2.56 moles) of Thiokol LP$_3$ (i.e. 16 S equivalents per mole of dithiol) are added, while the mixture is stirred. Thiokol LP$_3$ is a dithiol polysulphide with a molecular mass of 1,000. The reaction temperature is 150° C. When all the dithiol polysulphide has been added, the mixture is kept at around 150 to 160° C. for approximately half an hour, until an elastomeric polymer forms—Thiokol LP$_3$ is a dithiol polysulphide that has been cross-linked during its preparation, by the addition of trichloropropane, so that an elastomer polysulphide polymer is obtained directly.

Example 2

(2.1) 1.120 g. (35 equivalents) of sulphur and 3 g. of triethyl amine are placed in a 5-litre reactor, which is then heated to 120° C. 2,240 g. of mercapto ethyl adipate (i.e. 4 S equivalents per mole of dithiol) are added, while the mixture is stirred. The reaction temperature is 150° C. This temperature is held for approximately half an hour following the adding of the dithiol, until a plastic material is obtained.

(2.2) 335 g. (i.e. 10% of the quantity of sulphur and dithiol) of allyl maleate are added to the reagents described in § 2.1. The reaction occurs as before. Heating is continued until a polysulphide polymer with elastomeric properties is obtained.

(2.3) 335 g. (i.e. 10% of the quantity of sulphur and dithiol of the product resulting from the reaction of maleic anhydride and mercapto ethanol are added to the reagents described in §2.1. The reaction occurs as before, and heating is continued until a polysulphide polymer with elastomeric properties is obtained.

Example 3

(3.1) 960 g. of sulphur (30 equivalents) are heated to melting point in a reactor. 3 g. of dibutyl amine and, gradually, 1,920 g. (6.4 moles) of mercapto ethyl thiodipropionate (i.e. 4.6 S equivalents per mole of dithiol) are added. The temperature is 150° C., and this is held for approximately half an hour after all the dithiol has been added, until a plastic material is obtained.

(3.2) When 285 g. of propane trithiol are added to the reaction mixture, an elastomer material is obtained.

Example 4

(4.1) 1,024 g. (32 equivalents) of sulphur and 3 g. of tributyl amine are placed in a reactor, which is heated until the sulphur has melted. 1,353 g. (7.6 moles) of dimercapto diethyl formal (i.e. 4.2 S equivalents per mole of dithiol) are added while the mixture is stirred. The temperature is 150 to 160° C. This temperature is maintained for approximately half an hour after the dithiol has been added. A plastic material is obtained.

(4.2) If 240 g. of allyl maleate are added to the reaction mixture, an elastomer material is obtained.

EXAMPLES 5 TO 7

Example 5

The bitumen-modifying agents are prepared by dispersing polysulphide polymers in fluxing oil.

1,000 g. of the various polysulphide polymers prepared for earlier examples are added to 1,000 g. of fluxing oil heated to temperatures of 130 to 150° C., and the mixture is left to react for approximately half an hour.

Example 6

The bitumen-modifying agents are prepared by dispersing polysulphide polymers in an equal quantity of bitumen, and heating them for approximately half an hour at temperatures of around 160° C.

Example 7

The bitumen-modifying agents are prepared by dispersing polysulphide polymers in bitumen cuts, and more specifically in "Escorez 1071" and "Norsolene 65/75" resins.

1,000 g. of Escorez 1071 or Norsolene are placed in a reactor, which is heated to around 150° C. 1,000 g. of one of the polysulphide polymers already prepared in earlier examples are added, while the mixture is stirred, and reaction is allowed to go on for approximately half an hour. This results in the modifying agent, which can be added to the bitumen, whether fluxed or unfluxed, when being used.

Example 8

The bitumen-modifying agents are prepared in situ. 1,000 of molten bitumen, fluxing oil or bitumen cuts, 333 g. (10.5 equivalents) of sulphur, 0.9 g. of triethyl amine, 66.8 g. of mercapto ethyl adipate and 100 g. of allyl maleate are mixed together, and heated to around 150° C. This temperature is maintained for approximately half an hour, until an elastomer material is obtained. This modifying agent can be added directly to the mass of bitumen, in amounts that vary depending on the properties required for the bituminous composition.

Example 9

The process described in the previous example is repeated, except that the cross-linkage agent allyl maleate is replaced by the same amount of the product resulting from the reaction of maleic anhydride with mercapto ethanol. The amine used is diphenyl guanidine. The modifying agent obtained in this way can be added directly to the mass of bitumen, in varying amounts.

EXAMPLE 10.—PREPARATION OF MODIFIED BITUMENS

Bitumen, or bitumen already fluxed, as defined according to the invention, is placed in a bitumen heater. It is heated and melted, and a certain quantity of modifying agent (polysulphide polymer plus dispersal agent) is added. The mixture is stirred for 15 minutes, after which the bitumen is ready for use.

TABLES 1 TO 9

The tables on the following pages show the properties of modified bitumens obtained from different bitumens and modifying agents as described above.

TABLE 1

| | Composition | Test temperature in ° C. | | | | | | | |
|---|---|---|---|---|---|---|---|---|---|
| | | −33 | −23 | −5 | +5 | +18 | +30 | +40 | +55 |
| | | Cohesiveness in kgm./sq. cm. | | | | | | | |
| 1 | 60/70 bitumen | 1.90 | 1.80 | 2.69 | 3.07 | 2.74 | 2.60 | 2.52 | 2.81 |
| 2 | (1) plus 2.5% mercapto-ethyl adipate polysulphide dispersed in an equal quantity of bitumen | 2.28 | 2.82 | 3.58 | 3.88 | 4.31 | 4.71 | 4.47 | 5.65 |
| 3 | (1) plus 2.5% mercapto-ethyl adipate polysulphide cross-linked with allyl maleate and dispersed in an equal quantity of bitumen | 2.71 | 2.97 | 3.04 | 3.53 | 3.64 | 3.94 | 4.07 | 6.71 |
| 4 | (1) plus 2.5% mercapto-ethyl thiodipropionate polysulphide dispersed in an equal quantity of bitumen | 2.98 | 3.16 | 3.26 | 3.11 | 4.33 | 4.02 | 7.65 | 6.55 |
| 5 | (1) plus 2.5% dimercapto-diethyl formal polysulphide dispersed in an equal quantity of bitumen | 2.85 | 3.07 | 3.17 | 3.76 | 3.55 | 3.42 | 3.84 | 3.83 |
| 6 | (1) plus 2.5% mercapto-ethyl adipate polysulphide dispersed in an equal quanity of "Norsolene" 65/75 resin | 2.26 | 2.41 | 5.05 | 4.98 | 4.16 | 4.59 | 6.45 | 5.11 |
| 7 | (1) plus 2.5% mercapto-ethyl adipate polysulphide dispersed in an equal quantity of "Escorez 1071" resin | 2.32 | 2.38 | 4.30 | 4.50 | 4.12 | 6.16 | 6.58 | 9.21 |

NOTE.—Unaged bitumen.

TABLE 2.—EFFECT OF U.V. RADIATION

| Composition | Test temperature in °C. Cohesiveness in kgm./sq. cm. | | | | | | | |
|---|---|---|---|---|---|---|---|---|
| | −33 | −23 | −5 | +5 | +18 | +30 | +40 | +55 |
| 1...... 60/70 bitumen | 2.16 | 2.51 | 1.57 | 3.74 | 3.94 | 3.90 | 4.72 | 7.22 |
| 2...... (1) plus 2.5% mercapto-ethyl adipate polysulphide dispersed in an equal quantity of bitumen | 3.20 | 3.43 | 3.13 | 4.34 | 4.21 | 4.38 | 4.62 | 4.12 |
| 3...... (1) plus 2.5% mercapto-ethyl adipate polysulphide cross-linked with allyl maleate and dispersed in an equal quantity of bitumen | 3.06 | 3.02 | 4.89 | 5.03 | 4.78 | 4.86 | 5.50 | 5.22 |
| 4...... (1) plus 2.5% mercapto-ethyl thiodipropionate polysulphide dispersed in an equal quantity of bitumen | 2.82 | 2.84 | 3.03 | 2.59 | 2.44 | 2.62 | 4.23 | 3.84 |
| 5...... (1) plus 2.5% dimercapto-diethyl formal polysulphide dispersed in an equal quantity of bitumen | 1.98 | 2.15 | 3.03 | 2.81 | 2.93 | 3.03 | 3.29 | 4.48 |
| 6...... (1) plus 2.5% mercapto-ethyl adipate polysulphide dispersed in an equal quantity of "Norsolene" 65/75 resin | 2.50 | 2.92 | 4.81 | 5.20 | 5.10 | 5.90 | 6.50 | 6.05 |
| 7...... (1) plus 2.5% mercapto-ethyl adipate polysulphide dispersed in an equal quantity of "Escorez 1071" resin | 2.40 | 3.02 | 3.60 | 4.25 | 5.80 | 6.01 | 5.34 | 8.05 |

Note.—Bitumen aged in U.V. rays for 72 hours in an oxidizing oven at 55° C.

TABLE 3.—EFFECT OF I.R. RADIATION

| Composition | Test temperature in °C. Cohesiveness in kgm./sq. cm. | | | | | | | |
|---|---|---|---|---|---|---|---|---|
| | −33 | −23 | −5 | +5 | +18 | +30 | +40 | +55 |
| 1...... 60/70 bitumen | 2.87 | 3.58 | 2.74 | 1.59 | 2.50 | 3.01 | 4.50 | 5.97 |
| 2...... (1) plus 2.5% mercapto-ethyl adipate polysulphide dispersed in an equal quantity of bitumen | 3.11 | 3.41 | 3.60 | 3.71 | 3.52 | 3.21 | 3.34 | 5.96 |
| 3...... (1) plus 2.5% mercapto-ethyl adipate polysulphide cross-linked with allyl maleate and dispersed in an equal quantity of bitumen | 3.59 | 3.71 | 3.97 | 4.35 | 4.20 | 4.33 | 4.93 | 8.16 |
| 4...... (1) plus 2.5% mercapto-ethyl thiodipropionate polysulphide dispersed in an equal quantity of bitumen | 2.37 | 2.80 | 3.03 | 2.46 | 2.47 | 2.70 | 3.87 | 5.04 |
| 5...... (1) plus 2.5% dimercapto-diethyl formal polysulphide dispersed in an equal quantity of bitumen | 3.46 | 4.12 | 3.19 | 3.04 | 4.50 | 3.84 | 5.64 | 5.57 |
| 6...... (1) plus 2.5% mercapto-ethyl adipate polysulphide dispersed in an equal quantity of "Norsolene" 65/75 resin | 2.58 | 3.99 | 4.24 | 4.42 | 6.12 | 4.35 | 8.25 | 6.48 |
| 7...... (1) plus 2.5% mercapto-ethyl adipate polysulphide dispersed in an equal quantity of "Escorez 1071" resin | 2.98 | 3.37 | 3.80 | 4.60 | 5.48 | 6.80 | 7.70 | 9.30 |

Note.—Bitumen aged in I.R. rays for 72 hours in an oxidizing oven at 55° C.

TABLE 4

| Composition | Test temperature in °C. Cohesiveness in kgm./sq. cm. | | | | | | | |
|---|---|---|---|---|---|---|---|---|
| | −33 | −23 | −5 | +5 | +18 | +30 | +40 | +55 |
| 1...... Basic binder: 60/70 bitumen plus 2.5% 1,200/2,000 BRTA fluxing oil for standard spreading | 2.68 | 3.63 | 3.39 | 2.68 | 3.47 | 3.92 | 3.12 | 1.97 |
| 2...... (1) plus 2.5% mercapto-ethyl adipate polysulphide dispersed in an equal quantity of fluxing oil | 3.75 | 3.82 | 4.49 | 4.52 | 4.86 | 6.76 | 6.58 | 4.22 |
| 3...... (1) plus 6.5% mercapto-ethyl adipate polysulphide cross-linked with allyl maleate and dispersed in an equal quantity of fluxing oil | 3.97 | 4.52 | 3.64 | 3.83 | 5.72 | 5.95 | 6.80 | 6.32 |
| 4...... (1) plus 2.5% mercapto-ethyl thiodipropionate polysulphide dispersed in an equal quantity of fluxing oil | 4.10 | 3.03 | 4.11 | 4.38 | 7.46 | 7.49 | 6.15 | 4.03 |
| 5...... (1) plus 2.5% dimercapto-diethyl formal polysulphide dispersed in an equal quantity of fluxing oil | 3.21 | 3.05 | 3.09 | 3.60 | 3.99 | 6.27 | 5.72 | 4.65 |
| 6...... (1) plus 2.5% mercapto-ethyl adipate polysulphide dispersed in an equal quantity of "Norsolene" 65/75 resin | 3 | 4.10 | 4.32 | 6.93 | 5 | 13.26 | 14.40 | 13.98 |
| 7...... (1) plus 2.5% mercapto-ethyl adipate polysulphide dispersed in an equal quantity of "Escorez 1071" resin | 3.10 | 3.26 | 4.80 | 5.10 | 4.65 | 11.20 | 11.70 | 11.10 |
| 8...... (1) plus 2.8% LP₃ polysulphide dispersed in an equal quantity of fluxing oil | 3.60 | 2.29 | 3.99 | 2.88 | 2.93 | 7.77 | 5.12 | 2.29 |
| 9...... (1) plus 2.5% mercapto-ethyl adipate polysulphide cross-linked with maleic anhydride/mercapto ethanol reaction product | 2.87 | 2.93 | 4.42 | 4.88 | 5.57 | 6.54 | 7.64 | 11.04 |
| 10..... As (3), but polysulphide prepared in situ | 4.96 | 5.65 | 4.55 | 4.97 | 7.44 | 7.73 | 7.25 | 7.58 |
| 11..... As (9), but polysulphide prepared in situ | 3.44 | 3.51 | 5.77 | 6.34 | 7.24 | 8.50 | 9.55 | 13.20 |

Note.—Unaged bitumen.

TABLE 5.—EFFECT OF U.V. RADIATION

| Composition | Test temperature in °C. Cohesiveness in kgm./sq. cm. | | | | | | | |
|---|---|---|---|---|---|---|---|---|
| | −33 | −23 | −5 | +5 | +18 | +30 | +40 | +55 |
| 1...... Basic binder: 60/70 bitumen plus 2.5% 1,200/2,000 BRTA fluxing oil for standard spreading | 2.59 | 2.41 | 2.89 | 3.42 | 3.58 | 8.22 | 8.45 | 4.96 |
| 2...... (1) plus 2.5% mercapto-ethyl adipate polysulphide dispersed in an equal quantity of fluxing oil | 3.10 | 3.02 | 4.89 | 5.03 | 4.78 | 4.96 | 5.50 | 5.22 |
| 3...... (1) plus 2.5% mercapto-ethyl adipate polysulphide cross-linked with allyl maleate and dispersed in an equal quantity of fluxing oil | 3.56 | 3.56 | 4.79 | 4.49 | 4.36 | 4.92 | 7.05 | 6.47 |
| 4...... (1) plus 2.5% mercapto-ethyl thiodipropionate polysulphide dispersed in an equal quantity of fluxing oil | 3.08 | 3.50 | 3.13 | 4.34 | 4.21 | 4.38 | 4.69 | 8.12 |
| 5...... (1) plus 2.5% dimercapto-diethyl formal polysulphide dispersed in an equal quantity of fluxing oil | 2.90 | 3.15 | 3.24 | 3.34 | 3.62 | 5.64 | 5.11 | 8.61 |
| 6...... (1) plus 2.5% mercapto-ethyl adipate polysulphide dispersed in an equal quantity of "Norsolene" 65/75 resin | 3 | 4 | 4.80 | 5.90 | 5.83 | 9.20 | 9.10 | 9.75 |
| 7...... (1) plus 2.5% mercapto-ethyl adipate polysulphide dispersed in an equal quantity of "Escorez 1071" resin | 3.05 | 4.07 | 4 | 4.30 | 4.89 | 8.50 | 8.10 | 8.05 |
| 8...... (1) plus 2.8% LP₃ polysulphide dispersed in an equal quantity of fluxing oil | 3.38 | 3.22 | 3.94 | 3.73 | 4.03 | 4.74 | 5.91 | 8.68 |
| 9...... (1) plus 2.5% mercapto-ethyl adipate polysulphide cross-linked with maleic anhydride/mercapto ethanol reaction product | 2.57 | 5.38 | 5.30 | 5.39 | 5.79 | 5.80 | 8.22 | 8.56 |
| 10..... AS(3), but polysulphide prepared in situ | 4.27 | 4.28 | 5.98 | 5.83 | 5.66 | 6.15 | 8.81 | 7.76 |
| 11..... AS(9), but polysulphide prepared in situ | 3.08 | 6.45 | 6.62 | 7.00 | 7.52 | 7.54 | 10.27 | 10.27 |

Note.—Bitumen aged in U.V. rays for 72 hours in an oxidizing oven at 55° C.

TABLE 6.—EFFECT OF I.R. RADIATION

| | Test temperature in ° C. | | | | | | | |
|---|---|---|---|---|---|---|---|---|
| | −33 | −23 | −5 | +5 | +18 | +30 | +40 | +55 |
| Composition | Cohesiveness in kgm./sq. cm. | | | | | | | |
| 1. Basic binder: 60/70 bitumen plus 2.5% 1,200/2,000 BRTA fluxing oil for standard spreading. | 2.57 | 2.09 | 2.05 | 3.57 | 3.86 | 3.41 | 5.97 | 8.68 |
| 2. (1) plus 2.5% mercapto-ethyl adipate polysulphide dispersed in an equal quantity of fluxing oil. | 3.76 | 3.71 | 4.35 | 3.97 | 4.20 | 5.33 | 5.99 | 8.16 |
| 3. (1) plus 2.5% mercapto-ethyl adipate polysulphide cross-linked with allyl maleate and dispersed in an equal quantity of fluxing oil. | 4.14 | 5.87 | 6.72 | 7.05 | 6.71 | 6.16 | 6.63 | 5.89 |
| 4. (1) plus 2.5% mercapto-ethyl thiodipropionate polysulphide dispersed in an equal quantity of fluxing oil. | 3.04 | 3.42 | 3.57 | 4.11 | 4.71 | 5.43 | 5.74 | 7.63 |
| 5. (1) plus 2.5% dimercapto-diethyl formal polysulphide dispersed in an equal quantity of fluxing oil. | 3.37 | 2.99 | 3.10 | 3.27 | 3.82 | 3.55 | 3.54 | 5.94 |
| 6. (1) plus 2.5% mercapto-ethyl adipate polysulphide dispersed in an equal quantity of "Norsolene" 65/75 resin. | 3.42 | 4.25 | 4.50 | 6.12 | 6 | 10.04 | 10.44 | 11.18 |
| 7. (1) plus 2.5% mercapto-ethyl adipate polysulphide dispersed in an equal quantity of "Escorez 1071" resin. | 2.98 | 4.10 | 4.04 | 4.95 | 5.28 | 8.74 | 8.12 | 7.90 |
| 8. (1) plus 2.8% $LP_3$ polysulphide dispersed in an equal quantity of fluxing oil. | 3.11 | 3.95 | 3.98 | 3.92 | 4.52 | 4.99 | 4.86 | 6.80 |
| 9. (1) plus 2.5% mercapto-ethyl adipate polysulphide cross-linked with maleic anhydride/mercapto ethanol reaction product. | 3.19 | 3.53 | 3.87 | 3.75 | 4.66 | 4.80 | 4.33 | 4.08 |
| 10. As (3), but polysulphide prepared in situ. | 4.94 | 7.04 | 8.40 | 9.16 | 8.72 | 8.00 | 8.28 | 7.07 |
| 11. As (9), but polysulphide prepared in situ. | 3.83 | 4.23 | 4.83 | 4.87 | 6.5 | 6.14 | 5.36 | 4.89 |

Note.—Bitumen aged in I.R. rays for 72 hours in an oxidizing oven at 55° C.

TABLE 7

| | Test temperature in ° C. | | | | | | | |
|---|---|---|---|---|---|---|---|---|
| | −33 | −23 | −5 | +5 | +18 | +30 | +40 | +55 |
| Composition | Cohesiveness in kgm./sq. cm. | | | | | | | |
| 1. 80/100 bitumen | 1.58 | 2.50 | 2.87 | 1.95 | 2.40 | 2.33 | 2.74 | 7.87 |
| 2. 80/100 bitumen plus 0.5% dimercapto-diethyl formal polysulphide dispersed in an equal quantity of bitumen. | 2.31 | 2.67 | 3.15 | 2.71 | 3.36 | 3.05 | 5.29 | 9.22 |
| 3. 80/100 bitumen plus 0.5% mercapto-ethyl thiodipropionate polysulphide dispersed in an equal quantity of bitumen. | 2.50 | 2.86 | 2.85 | 2.55 | 3.28 | 2.91 | 6.65 | 7.33 |
| 4. Fluxed 80/100 bitumen plus 0.5% mercaptoethyl thiodipropionate polysulphide dispersed in an equal quantity of fluxing oil. | 2.03 | 2.97 | 2.33 | 3.52 | 3.95 | 3.54 | 7.36 | 8.15 |
| 5. Fluxed 80/100 bitumen plus 0.5% dimercaptodiethyl formal polysulphide dispersed in an equal quantity of fluxing oil. | 2.19 | 2.91 | 2.21 | 2.92 | 2.83 | 8.54 | 6.47 | 4.89 |
| 6. Fluxed 80/100 bitumen plus 2.8% $LP_3$ polysulphide dispersed in an equal quantity of fluxing oil. | 3.47 | 4.70 | 5.33 | 4.50 | 12.19 | 12.92 | 8.46 | 9.99 |

Note.—Unaged bitumen.

TABLE 8.—EFFECT OF U.V. RADIATION

| | Test temperature in ° C. | | | | | | | |
|---|---|---|---|---|---|---|---|---|
| | −33 | −23 | −5 | +5 | +18 | +30 | +40 | +55 |
| Composition | Cohesiveness in kgm./sq. cm. | | | | | | | |
| 1. 80/100 bitumen | 1.71 | 1.67 | 2.02 | 2.48 | 2.66 | 2.18 | 2.49 | 6.34 |
| 2. 80/100 bitumen plus 0.5% dimercapto-diethyl formal polysulphide dispersed in an equal quantity of bitumen. | 2.63 | 2.45 | 3.83 | 3.05 | 2.88 | 3.43 | 3.58 | 3.06 |
| 3. 80/100 bitumen plus 0.5 mercapto-ethyl thiodipropionate polysulphide dispersed in an equal quantity of bitumen. | 3.30 | 2.32 | 4.36 | 5.15 | 5.08 | 4.08 | 9.14 | 8.84 |
| 4. Fluxed 80/100 bitumen plus 0.5% mercaptoethyl thiodipropionate polysulphide dispersed in an equal quantity of fluxing oil. | 3.56 | 3.08 | 4.02 | 4.20 | 4.30 | 4.36 | 9.69 | 9.69 |
| 5. Fluxed 80/100 bitumen plus 0.5% dimercaptodiethyl formal polysulphide dispersed in an equal quantity of fluxing oil. | 2.32 | 2.73 | 2.92 | 2.86 | 2.68 | 3.17 | 4.94 | 3.70 |
| 6. Fluxed 80/100 bitumen plus 2.8% $LP_3$ polysulphide dispersed in an equal quantity of fluxing oil. | 3.98 | 2.70 | 3.25 | 3.53 | 3.80 | 5.26 | 13.50 | 10.43 |

Note.—Bitumen aged in U.V. rays for 72 hours in an oxidizing oven at 55° C.

TABLE 9.—EFFECT OF I.R. RADIATION

| | Test temperature in ° C. | | | | | | | |
|---|---|---|---|---|---|---|---|---|
| | −33 | −23 | −5 | +5 | +18 | +30 | +40 | +55 |
| Composition | Cohesiveness in kgm./sq. cm. | | | | | | | |
| 1. 80/100 bitumen | 2.10 | 1.34 | 2.09 | 1.88 | 2.62 | 2.10 | 2.80 | 7.40 |
| 2. 80/100 bitumen plus 0.5% dimercaptodiethyl formal polysulphide dispersed in an equal quantity of bitumen. | 2.37 | 2.96 | 2.57 | 3.23 | 2.01 | 2.99 | 4.70 | 8.28 |
| 3. 80/100 bitumen plus 0.5% mercapto-ethyl thiodipropionate polysulphide dispersed in an equal quantity of bitumen. | 3.19 | 2.37 | 3.39 | 2.58 | 3.45 | 9.79 | 6.00 | 6.12 |
| 4. Fluxed 80/100 bitumen plus 0.5% mercaptoethyl thiodipropionate polysulphide dispersed in an equal quantity of fluxing oil. | 2.68 | 2.46 | 2.97 | 3.99 | 3.19 | 3.69 | 7.97 | 7.71 |
| 5. Fluxed 80/100 bitumen plus 0.5% dimercaptodiethyl formal polysulphide dispersed in an equal quantity of fluxing oil. | 2.15 | 2.83 | 4.53 | 3.76 | 3.12 | 3.18 | 9.85 | 8.15 |
| 6. Fluxed 80/100 bitumen plus 2.8% $LP_3$ polysulphide dispersed in an equal quantity of fluxing oil. | 3.39 | 4.04 | 3.67 | 4.68 | 4.18 | 13.27 | 12.05 | 8.97 |

Note.—Bitumen aged in I.R. rays for 72 hours in an oxidizing oven at 55° C.

What is claimed is:

1. A process for the preparation of bituminous compositions for existing applications of bitumen, characterized by the fact that one or more plastic or elastomer polysulphide polymers obtained by the reaction of sulphur with a dithiol or dithiol polysulphide, free from non-combined elemental sulphur, and which will mix with fluxing oil, bitumen, bitumen cuts or fractions of such cuts, are added to the bitumen.

2. A process according to claim 1, in which the plastic or elastomer polysulphide polymer is added to hot bitumen by dispersing it in fluxing oil, bitumen, bitumen cuts or fractions of such cuts, consisting of coumarone oils, polyindenic oils, or polyolefin, aliphatic or aromatic resins extracted from petroleum or coal oils, with which the said polysulphide polymer react.

3. A process according to claim 1, in which the polysulphide polymers are obtained by the reaction of sulphur with a dithiol, the proportion of sulphur being between 1 and 20 equivalents per mole of dithiol, at temperatures of between 120 and 160° C., the reaction being continued for half an hour after adding of the dithiol.

4. A process according to claim 3, in which the proportion of sulphur is between 3 and 10 equivalents per mole of dithiol.

5. A process according to claim 1, in which the polysulphide polymers are obtained in situ by polymerizing monomer dithiols or dithiol polysulphides within the bitumen, or in fluxing oil or bitumen cuts or fractions of such cuts.

6. A process according to claim 1, in which the polysulphide polymer is cross-linked during preparation, by means of a trifunctional compound selected from the group consisting of propane trithiol, allyl maleate, aromatic polyacid and mercapto alcohol esters, and the reaction product of maleic anhydride and mercapto alcohol.

7. A process according to claim 1, in which the dithiol used in the preparation of plastic and elastomer polysulphide polymer is a dithiol diester of saturated aliphatic, aromatic alkyl-aromatic or cyclanic diacid.

8. A process according to claim 7, in which the dithiol is mercapto ethyl adipate.

9. A process according to claim 7, in which the dithiol is mercapto ethyl thiodipropionate.

10. A process according to claim 7, in which the dithiol is mercapto ethyl thioglycolate.

11. New bituminous compositions characterized by being a mixture of a plastic or elastomer polysulphide polymer obtained by the reaction of sulphur with a dithiol or dithiol polysulphide, free from non-combined sulphur, and which will mix with fluxing oil, bitumen, bitumen cuts or fractions of such cuts, and bitumen.

12. New compositions according to claim 11, characterized by the fact that the plastic or elastomer polysulphide polymer is dispersed in fluxing oil, bitumen cuts or fractions of such cuts, consisting of coumarone oils, polyindenic oils, or polyolefin, aliphatic or aromatic resins extracted from petroleum or coal oils, with which the same polysulphide polymer react.

13. New compositions according to claim 11, characterized by the fact that the polysulphide polymers are obtained by the reaction of sulphur with a dithiol, the proportion of sulphur being between 1 and 20, equivalents per mole of dithiol, at between 120 and 160° C., the reaction being continued for half an hour after adding of the dithiol.

14. New compositions according to claim 11, characterized by the fact that the polysulphide polymers are obtained in situ by polymerizing monomer dithiol or dithiol polysulphides within the bitumen, or fluxing oil or bitumen cuts or fractions of such cuts.

15. New compositions according to claim 11, characterized by the fact that the polysulphide polymer is cross-linked during preparation, by means of a trifunctional compound selected from the group consisting of propane trithiol, allyl maleate, aromatic polyacid and mercapto alcohol esters, and the reaction product of maleic anhydride and mercapto alcohol.

16. New compositions according to claim 11, characterized by the fact that the dithiol used in the preparation of plastic and elastomer polysulphide polymer is a dithiol diester of saturated aliphatic, aromatic, alkyl-aromatic or cyclanic diacids.

17. A process according to claim 7 in which the dithiol diester is of the formula

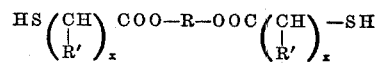

wherein R is an aliphatic hydrocarbon group of 2 to 12 carbon atoms which can contain chalogen elements, R' is hydrogen or a hydrocarbon group of 2 to 12 carbon atoms and $x$ is 2–10.

18. New compositions according to claim 16, characterized by the fact that the dithiol diester is of the formula

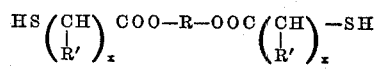

wherein R is an aliphatic hydrocarbon group of 2–12 carbon atoms which can contain chalogen elements, R' is hydrogen or a hydrocarbon group of 2–12 carbon atoms, and $x$ is 2–10.

19. New compositions according to claim 11 characterized by the fact that the amount of polysulphide polymer is between 0.2 and 10%.

20. New compositions according to claim 19 characterized by the fact that the amount of the polysulphide polymer is 0.5 to 2.5 weight percent.

21. A process according to claim 1 in which the polysulphide polymer is between 0.2 and 10 percent.

22. A process according to claim 21 in which the amount of polysulphide polymer is 0.5 to 2.5 weight percent.

References Cited
UNITED STATES PATENTS

| | | | |
|---|---|---|---|
| 3,540,961 | 11/1970 | Shipp et al. | 260—28 |
| 3,491,046 | 1/1970 | Pachuta | 260—28 |
| 2,910,922 | 11/1959 | Horning | 260—28 |
| 3,316,194 | 11/1967 | Payne | 260—28 |

MORRIS LIEBMAN, Primary Examiner

S. L. FOX, Assistant Examiner

U.S. Cl. X.R.

106—274; 208—44